US011930000B2

(12) United States Patent
Meschiari et al.

(10) Patent No.: US 11,930,000 B2
(45) Date of Patent: Mar. 12, 2024

(54) DETECTION OF ANOMALOUS AUTHENTICATIONS (71) Applicant: Cisco Technology, Inc., San Jose, CA (US)

(72) Inventors: Stefano Meschiari, Portland, OR (US); Bronwyn Lewisia Woods, Pittsburgh, PA (US); Kwan Lok Ernest Chan, Austin, TX (US); Jillian Haller, Austin, TX (US); Laura Kristen Cole, Austin, TX (US)

(73) Assignee: CISCO TECHNOLOGY, INC., San Jose, CA (US)

(*) Notice: Subject to any disclaimer, the term of this patent is extended or adjusted under 35 U.S.C. 154(b) by 373 days.

(21) Appl. No.: 17/461,307

(22) Filed: Aug. 30, 2021

(65) Prior Publication Data
US 2023/0036917 A1  Feb. 2, 2023

Related U.S. Application Data (60) Provisional application No. 63/228,367, filed on Aug. 2, 2021.

(51) Int. Cl.
G06F 21/00 (2013.01)
G06N 20/00 (2019.01)
H04L 9/40 (2022.01)

(52) U.S. Cl.
CPC ............ *H04L 63/08* (2013.01); *G06N 20/00* (2019.01)

(58) Field of Classification Search
CPC ...... H04L 63/08; H04L 63/1425; G06N 20/00
See application file for complete search history.

(56) References Cited

U.S. PATENT DOCUMENTS 11,432,143 B2 * 8/2022 Norton, Jr. ............ H04W 12/06
11,537,902 B1 * 12/2022 Aydore .................. G06N 3/047
(Continued)

OTHER PUBLICATIONS

Alejandro G. Martín, Marta Beltrán, Alberto Fernández-Isabel, Isaac Martín de Diego, An approach to detect user behaviour anomalies within identity federations, Computers & Security, vol. 108,2021 (https://www.sciencedirect.com/science/article/pii/S0167404821001802) (Year: 2021).*

*Primary Examiner* — Kendall Dolly
(74) *Attorney, Agent, or Firm* — Lee & Hayes P.C.

(57) ABSTRACT

Techniques for training and using models to analyze multiple attributes of an authentication, and detect anomalous authentications that may include security threats. An authentication platform may use historical authentication data to train models to identify common attributes for authentications of users, and the training may be performed without the use of labels. For instance, models may be trained for each attribute of the historical authentications (e.g., geographic location, type of authentication method, type of device, time of day, etc.) to "learn" common behaviors of users across attributes of historical authentications. The models can then be applied to new authentications to determine, on an attribute-by-attribute level, whether or not new authentications are anomalous as compared to historical authentications by the user. In this way, the models can learn common authentication behaviors of users without needing labels, and the models can then be applied to identify anomalous (and potentially malicious) authentications.

20 Claims, 7 Drawing Sheets (56) References Cited

U.S. PATENT DOCUMENTS

| | | | |
|---|---|---|---|
| 11,552,980 B2* | 1/2023 | Trentini | G06F 18/22 |
| 2013/0263282 A1* | 10/2013 | Yamada | G06V 40/1335 |
| | | | 726/28 |
| 2014/0282866 A1* | 9/2014 | Jakobsson | H04L 63/08 |
| | | | 726/3 |
| 2014/0289808 A1* | 9/2014 | Blanke | H04L 63/08 |
| | | | 726/4 |
| 2016/0036844 A1 | 2/2016 | Kopp et al. | |
| 2016/0373473 A1* | 12/2016 | Truong | G01C 21/28 |
| 2017/0063888 A1 | 3/2017 | Muddu et al. | |
| 2018/0191763 A1 | 7/2018 | Hillard et al. | |
| 2019/0370610 A1* | 12/2019 | Batoukov | G06F 11/0793 |
| 2020/0213337 A1* | 7/2020 | Hodgman | H04L 63/1425 |
| 2020/0296124 A1 | 9/2020 | Pratt et al. | |
| 2021/0194910 A1* | 6/2021 | Dodson | G06N 20/00 |
| 2021/0250342 A1* | 8/2021 | Budman | G06F 21/316 |
| 2022/0188694 A1* | 6/2022 | Suzani | G06F 17/18 |
| 2022/0376970 A1* | 11/2022 | Chawathe | H04L 41/0654 |
| 2023/0224289 A1* | 7/2023 | Kiyokawa | H04L 63/123 |
| | | | 726/4 |
| 2023/0262072 A1* | 8/2023 | Cambric | H04L 63/20 |
| | | | 726/22 |
| 2023/0267198 A1* | 8/2023 | Karpovsky | G06F 21/552 |
| | | | 726/23 |

* cited by examiner

DETECTION OF ANOMALOUS AUTHENTICATIONS

RELATED APPLICATIONS

This application claims priority to U.S. Provisional Application No. 63/228,367, filed on Aug. 2, 2021, the entire contents of which are incorporated herein by reference.

TECHNICAL FIELD

The present disclosure relates generally to training models to identify anomalous authentications by users, and flagging the anomalous authentications as potential security threats.

BACKGROUND

Authentication systems serve as a protective barrier to prevent unauthorized users from accessing applications, services, data, and so forth. Generally, authentications systems are security measures that require users to provide information to verify that the users attempting to access information or services are authorized to view the information and/or interact with the services. Traditionally, authentication systems have simply relied on usernames and passwords for authenticating users, but usernames and passwords are susceptible to attacks by malicious users that are attempting to access information or services to which they are unauthorized to access. For instance, malicious users can attempt to obtain usernames and passwords using phishing attacks, spoofing attacks, brute-force attacks, sniffing attacks, and so forth. Accordingly, usernames and passwords have increasingly become a less secure form of authentication.

More recently, authentication systems have begun using multiple-factor authentication (MFA), or two-factor authentication (2FA), where multiple forms of authentication are required to authenticate a user. For instance, authentications may require that a user provide two (or more) of a username/password authentication, biometric authentication, hardware-device authentication, multiple-device authentication, and so forth. However, even these more robust authentication techniques or protocols are subject to attacks from malicious users, and it is difficult for authentication systems to identify and prevent unauthorized access to resources by malicious users who have obtained valid credentials of users.

Machine-learning models have proven useful in detecting anomalous behavior as compared to trends in historical data with which the models have been trained. Typically, machine-learning models in the security space are trained use labels annotations that describe whether a certain action is benign or malicious—in order to leant to discriminate between threats and normal activity. In practice, however, many systems in the security space that would benefit from machine-learning models are critically hampered by a scarcity of labels. This may be due to many factors, such as low coverage of the collected labels, long latency between threats and receiving the corresponding label, and noise in the feedback from domain experts and the system's users. Often, new systems have to be bootstrapped in the complete absence of established historical data (or "cold starts"). Finally, attack scenarios are constantly evolving, and so are benign behaviors observed within an organization.

Many algorithms have been designed that can perform in an unsupervised regime (without labels). However, they typically suffer from high computational cost, are prone to the "curse of dimensionality" (it is hard to distinguish between irrelevant and relevant data attributes), and make it difficult to extract explanations that are useful to security analysts ("why is this event marked as a threat?"). The algorithms are often prone to high false positive rates, causing alarm fatigue for security analysts; while at the same time missing relevant, high-value threats. Additionally, these algorithms do not work well with authentication data that is often endowed with many categorical attributes (such as geolocation, type of device, user initiating the authentication, etc.) that might have very high cardinality, be correlated in subtle ways, and exhibit a latent hierarchical structure (e.g. users belonging to a sales department behave differently from users in the engineering department). The authentication data also evolves with time, reflecting changing user behaviors and different patterns of benign usage that is contextual to the users' activity.

Accordingly, it can be difficult to train models to identify anomalous, and potentially malicious, authentication events.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to training models to identify anomalous authentications by users without the use of labels, and flagging the anomalous authentications as potential security threats.

A method as described herein may include obtaining authentication data representing an authentication by a user that requested access to a resource, and identifying, from the authentication data, attributes associated with the authentication by the user. The attributes may include one or more of an identity of the user, a geographic location associated with a user device used by the user to perform the authentication, a type of a device used to perform the authentication, a first type of a first device and a second type of a second device used to perform a multi-factor authentication included in the authentication, at least one of a time of day or a day of a week at which the authentication was performed, an application or service attempting to be accessed by the user by performing the authentication, a type of authentication method performed as part of the authentication, or a type of network by which the user performed the authentication. The method may further include determining, at least partly by evaluating a first attribute, of the attributes, using a first model, a first anomaly score associated with the first attribute of the authentication. Generally, the first anomaly score indicates a first measure of divergence of the first attribute from historical attribute data associated with previous authentications by the user. Further, the method may include determining, at least partly by evaluating a second attribute, of the attributes, using a second model, a second anomaly score associated with the second attribute of the authentication. Similarly, the second anomaly score indicating a second measure of divergence of the second attribute from the historical attribute data. Additionally, the method may further include determining, based at least in part on the first anomaly score and the second anomaly score, an overall anomaly score indicating an overall measure of divergence of the authentication from the previous authentications. Even further, the method may include determining, using the overall anomaly score and a threshold anomaly score, whether the authentication is anomalous with respect to the previous authentications by the user.

Additionally, the techniques of the method, and any other techniques described herein, may be performed by a system and/or device having non-transitory computer-readable media storing computer-executable instructions that, when executed by one or more processors, performs the method(s) described above.

Example Embodiments

This disclosure describes techniques for training and using models to analyze multiple attributes of an authentication, and detect anomalous authentications that may include security threats. In some instances, an authentication platform uses historical authentication data to train models to identify common attributes for authentications of users, and the training may be performed without the use of labels. For instance, models may be trained for each attribute of the historical authentications (e.g., geographic location, type of authentication method, type of device, time of day, etc.) to "learn" common behaviors of users across attributes of historical authentications. The models can then be applied to new authentications to determine, on an attribute-by-attribute level, whether or not new authentications are anomalous as compared to historical authentications by the user. In this way, the models can learn common authentication behaviors of users without needing labels, and the models can then be applied to identify anomalous (and potentially malicious) authentications.

Generally, authentications systems are security measures that require users to provide information to verify that the users attempting to access information or services are authorized to view the information and/or interact with the services. Users that frequently use authentication systems to access resources, such as virtual private networks (VPNs), applications, services, etc., often do so according to pre-defined patterns. For instance, users accessing a VPN for work will often perform authentications using the same device (e.g., work laptop), from a same geographic location (e.g., work office), at a same time of day (e.g., 8:00 AM), and so forth. Further, that same user may periodically travel to another office for work, and while at that office, the attributes of the authentication may change. For instance, the user may authenticate at a different time of day (e.g., different time zone), may use a different device to authenticate, and so forth. Accordingly, while attributes of the authentications made by the users overtime may change, different patterns and trends often emerge overtime when analyzing historical authentication data.

However, when it comes to training machine-learning models to identify anomalous (and potentially malicious) authentications, it can be difficult due to the scarcity of labels for historical authentications. The scarcity in labels may be due to many factors, such as low coverage of the collected labels, long latency between threats and receiving the corresponding label, and noise in the feedback from domain experts and users.

Accordingly, this disclosure describes techniques for building models to detect anomalies in authentications that potentially correspond to security threats. The techniques include obtaining historical authentications for users that utilize an authentication platform for authenticating themselves to use applications or services. Generally, each authentication may be endowed with many attributes, and each attribute is generally many-valued in nature. The algorithms used herein may be "reconstruction"-type algorithms for anomaly detection such that, when applied to a new authentication observation, the algorithms attempt to recover the attributes of the observation one at a time, based on the features and context of the observation (including other attributes, sequences of values, etc.). The model(s) are able to discover the context within which typical behaviors are observed, and learn correlations between attributes (e.g. this user uses a certain device during the week, and another device during the weekend, as long as they're not traveling). The model(s) are then able to predict expected authentication properties on unseen data based on those correlations, and discount known behaviors. An authentication is then considered anomalous if the model is not able to accurately predict several of the authentication's properties.

Generally, an authentication platform (or other entity performing the techniques described herein) may train at least one supervised model (or "sub-model") per attribute. In such an example, each sub-model is self-supervised, and uses each attribute of interest as its own label. Each sub-model comprises one or more decision trees that can model non-linear interactions between different authentication features. Further, the authentication platform may use the model (and sub models) to help compute and output explanations of per-attribute anomalies by comparing the probability of the expected category of the attribute (e.g. location="US") with the observed category of the attribute (e.g. location="Canada"). The authentication platform may use the sub-models in an ensemble to generate a single anomaly score, which can be used for ranking and thresholding authentications. Further, the authentication platform may automatically account for low-quality models or concept drift (changes in the data that invalidates prior history) by weighing the contribution of each sub-model to the anomaly score using a quality metric. In some examples, the low-quality sub-models may be weighted differently than the high-quality sub-models by using, for instance, the Brier score of the model on a set of most recent days of data (e.g., one week, two weeks, etc.), and uses those scores or values as weighting values for the sub-models.

In addition to using an ensemble of sub-models to calculate an overall anomaly score for authentications, the authentication platform may output explanations regarding why an authentication was flagged as being anomalous. For instance, the authentication platform may determine which attribute, or attributes, attributed to the authentication being deemed anomalous (e.g., based on their respective sub-models outputting anomalous scores), and output explanations indicating the attributes that resulted in the authentication being flagged as anomalous and explanations as to why those attributes were flagged.

Although the techniques described herein are primarily with respect to authentications performed by an authentication platform, the techniques are equally applicable across any industry, technology, environment, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
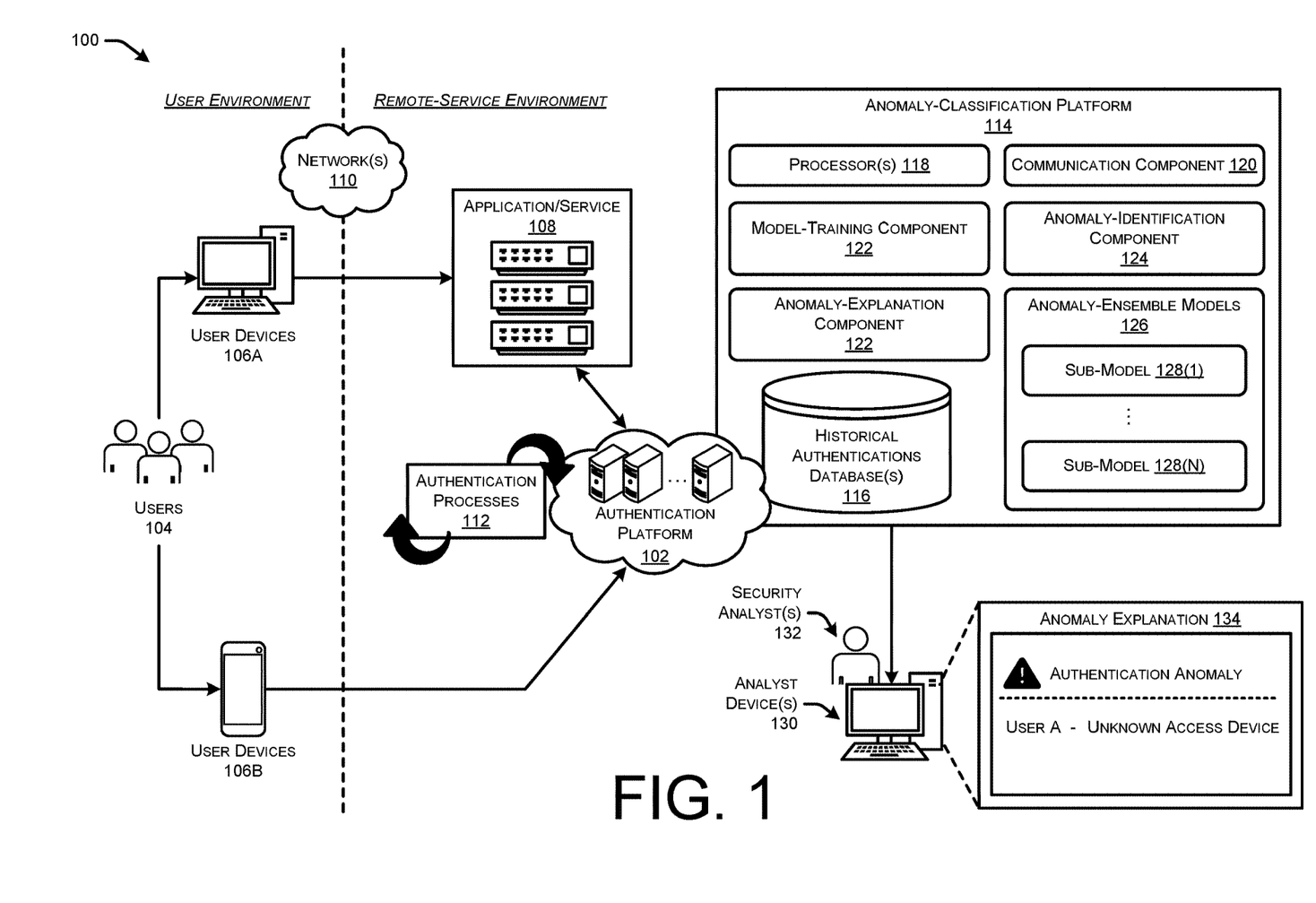
FIG. 1 illustrates a system-architecture diagram of an example environment in which an authentication platform trains models to identify anomalous authentications using training data in the absence of labels, and uses the models to identify anomalous authentications.

FIG. 1 illustrates a system-architecture diagram of an example environment 100 in which an authentication platform 102 trains models to identify anomalous authentications using training data in the absence of labels, and uses the models to identify anomalous authentications.

The authentication platform 102 may serve as a security measure that requires users 104 to provide information using one or more user devices 106 to verify that the users 104 attempting to access applications/services 108 are authorized to view the information and/or interact with the services 108. The user devices 106, and analysis devices 130, may be any type or one of computing devices configured to communicate over one or more networks 110, such as mobile phones, tablets, laptop computers, desktop computers, televisions, servers, wearable devices, servers, automobile computing devices, voice-controlled devices (e.g., virtual-agent based devices), and/or any other type of computing device. The network(s) 110 may include one or more of, or any combination of, wired and/or wireless networks such as personal area networks (PANs), wired and wireless local area networks (LANs), wired and/or wireless wide area networks (WANs), system area networks (SANs), campus area networks (CANs), and so forth.

The users 104 may use their user devices 106 to attempt to access applications/services 108, which are often online or web-based applications and services 108. In order to access or use the applications/services 108, the users 104 may be prompted or required to authenticate themselves as users 10 that are permitted to use the services 108. To do so, the authentication platform 102 may perform one or more authentications with the users 104 to verify identities of the users 104.

In some instances, the authentication platform 102 may simply use single-factor authentications, such as the user 104 using a user device 106 to provide a username and password that are linked to a particular identity. However, other types of single-factor authentication may also be used, such as biometric authentication, hardware-device authentication, multiple-device authentication, and so forth. Further, in some instances the authentication platform 102 may utilize multi-factor authentication techniques where two or more forms of authentication are required for users 104 to obtain access to the application/service 108.

The authentication platform 102 may perform various types of authentication processes 112 across various users 104 in order to obtain historical authentication data for the different users 104. Generally, each time a user 104 authenticates may be an authentication "event" or "instance," and each authentication event may be associated with multiple attributes. The attributes may be different types of data or metadata associated with an authentication event, such as an identity of the user 104, a geographic location associated with a user device 106 used by the user 104 to perform the authentication, a type of the user device 106 used to perform the authentication, a first type of a first device 106A and a second type of a second device 106B used to perform a multi-factor authentication included in the authentication, a time of day or a day of a week at which the authentication was performed, an application/service 108 attempting to be accessed by the user 104 by performing the authentication, a type of authentication method/process 112 performed as part of the authentication, a type of network by which the user 104 performed the authentication (e.g., cellular, WiFi, etc.), and so forth.

The authentication platform 102 may have or include an anomaly-classification platform 114 that supports techniques for identifying outliers, or anomalies, in authentication events as compared to attributes of historical authentications. The anomaly-classification platform 114 may include software components, hardware components, and/or other components and be supported by one or more computing devices. For instance, the anomaly-classification platform 114 may run on one or more servers located in one or more data centers. The anomaly-classification platform 114 may include one or more hardware processors 118 (processors), which may be one or more devices configured to execute one or more stored instructions. The processor(s) 118 may comprise one or more cores. Further, the anomaly-classification platform 114 may include a communication component 120 that includes one or more network interfaces configured to provide communications between the user devices 106 and the anomaly-classification platform 114, and/or other systems or devices. The network interfaces may include devices configured to couple to personal area networks (PANs), wired and wireless local area networks (LANs), wired and wide area networks (WANs), and so forth. For example, the network interfaces may include devices compatible with Ethernet, Wi-Fi, TCP/IP, and so forth.

The anomaly-classification platform 114 may include a model-training component 122 configured to train an anomaly-ensemble model 126 that includes multiple sub-models 128(1)-128(N) (where "N" is any integer greater than "1") that are trained to determine anomaly scores for attributes of authentications. Generally, each sub-model 128 is configured to determine, for one attribute, an anomaly score or value indicating how anomalous the authentication is for that specific attribute. The model-training component 122 may utilize the historical authentications for users in order to train anomaly-ensemble models 126 for each user 104 in order to detect anomalous authentications, which may be performed by an unauthorized user.

Generally, each authentication is endowed with multiple attributes, and each attribute is generally many-valued in nature. The algorithms used by the model-training component 122 may be "reconstruction"-type algorithms for anomaly detection such that, when applied to a new authentication observation, the anomaly-ensemble models 126 attempt to recover the attributes of the observation one at a time, based on the features and context of the observation (including other attributes, sequences of values, etc.). The anomaly-ensemble models 126 are able to discover the context within which typical behaviors are observed, and learn correlations between attributes (e.g. this user 104 uses a certain device during the week, and another device 106 during the weekend, as long as they're not traveling). The anomaly-ensemble models 126 are then able to predict expected authentication properties on unseen data based on those correlations, and discount known behaviors. An authentication is then considered anomalous if the model is not able to accurately predict several of the authentication's properties.

The model-training component 122 may train each sub-model 128 using supervised training (potentially unsupervised training in some instances) per attribute. In such examples, each sub-model 128 is self-supervised, and uses each attribute of interest as its own label. Each sub-model 128 may comprise one or more decision trees that can model non-linear interactions between different authentication features. In some instances, rather than learning an unsupervised model on vectors of observations "x" with 'M' attributes of interest and a latent (unobserved) label, the model-training component 122 may train "M" supervised sub-models 128 "S" predicting each attribute in term, using the other attributes as features, as shown below in Equations 1-3:

$$\text{device} \sim S_1(\text{factor, application, user, location, ...}) \quad \text{Equation 1:}$$

$$\text{application} \sim S_2(\text{factor, device, user, location ...}) \quad \text{Equation 2:}$$

$$\text{factor} \sim S_1(\text{application, device, user, location ...}) \quad \text{Equation 3:}$$

As shown above, Equations 1-3 illustrate how attributes of device being used, application being accessed, and authentication factor used, are used to train the different sub-models 128 where the other attributes are used as features by the model-training component 122. In this way, authentication events may be represented on an attribute-by-attribute basis where features are the other attributes, and the sub-models 128 are trained to determine, on an attribute level, whether the other attributes are anomalous.

Further, for each sub-model 128, the model-training component 122 may compute weighting values "w" that represent the quality of the sub-model 128 and how well it performs with more recent data. For instance, the sub-models 128 may be trained using authentication events collected for users 104 over the past 6 months, and the weighting values may indicate how accurate each sub-model 128 is for identifying anomalous authentications on more recent authentications (e.g., performed in the past 2 weeks). These weighting values "w" may be implemented as the Brier score of that sub-model 128 where the Brier score is a scoring rule that measures the accuracy of probabilistic predictions.

Once trained, an anomaly-identification component 124 of the anomaly-classification platform 114 may use the anomaly-ensemble models 126 to help identify anomalous authentications made by users 104 (authorized and/or unauthorized users). The anomaly-identification component 124 may compute an anomaly ratio "r" for each attribute "j" (e.g., geolocation, device, factor, etc.) where the ratio "r" is the ratio between the highest probability associated with expected attribute values "$X_{alt}$" and the probability of the actually observed attribute "$X_{obs}$" as shown below:

$$\frac{p_j(x_{ij} = X_{alt}|x_i)}{p_j(x_{ij} = X_{obs}|x_i)} \quad \text{Equation 5}$$

In Equation 5, each probability "p" is returned by the underlying sub-models 128 across each attribute. Further, the anomaly-identification component 124 may compare the anomaly score "A" by taking an average of all the anomaly ratios "r," weighted by the weights "w" calculated for each sub-model 128, as shown below:

$$A_{(x_i)} = \frac{\sum_{j=1}^{M} w_j r_j(x_i)}{\sum_{j=1}^{M} w_j} \quad \text{Equation 6}$$

After calculating the anomaly score "A," the anomaly-identification component 124 may determine whether the anomaly score "A" indicates an anomalous authentication or not, such as by comparing the anomaly score to a threshold anomaly score. The threshold anomaly score may be a score determined through testing that is associated with a high probability or confidence that an authentication is anomalous.

Once the anomaly-identification component 124 has identified anomalous authentications events, an anomaly-explanation component 122 may be configured to determine and provide an anomaly explanation 134 to security analysts 132 that are associated with the anomaly-classification platform 114. For instance, the anomaly-identification component 124 may determine, based on which attributes were identified as anomalous, explanations 134 that help inform the security analysts 132 why the authentication was flagged as anomalous. The security analysts 132 may utilize analyst devices 130 to take various actions with respect to the anomalous authentications, such as marking the anomalous authentication as safe, marking the anomalous authentication as a security threat, and so forth.

While not illustrated, the anomaly-classification platform 114 may include non-transitory computer-readable media that may store one or more operating systems utilized to control the operation of the one or more devices and/or software components that comprise the anomaly-classification platform 114. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2:
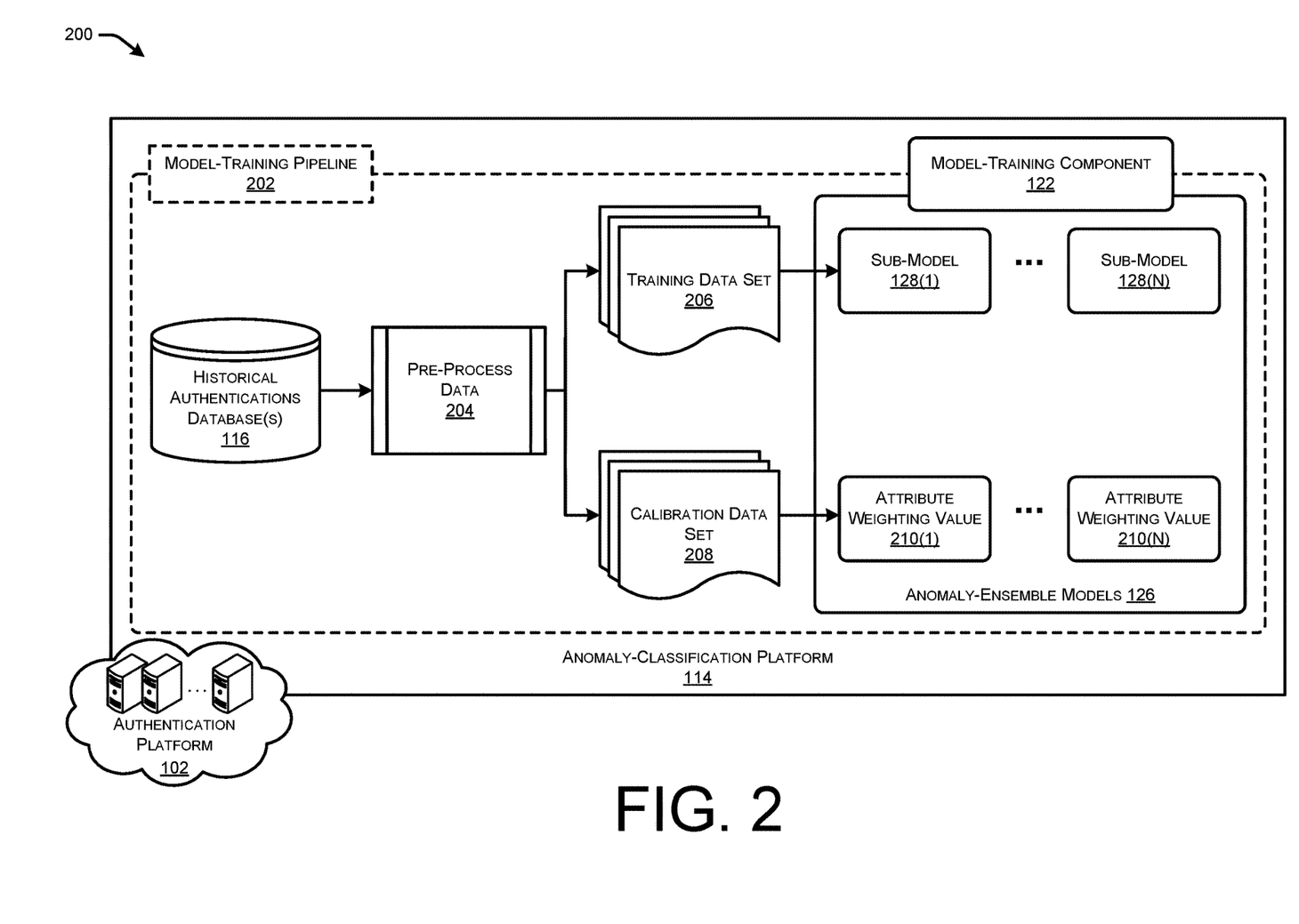
FIG. 2 illustrates a system-architecture diagram of an example environment in which an authentication platform trains models to identify anomalous authentications using training data in the absence of labels.

FIG. 2 illustrates a system-architecture diagram of an example environment 200 in which an authentication platform 102 trains models 128 to identify anomalous authentications using training data in the absence of labels. As illustrated, the model-training component 122 may train the models 128 according to a model-training pipeline 202.

The anomaly-classification platform 114 may store historical-authentication data in one or more historical authentications databases 116. The model-training component 122 may, at 204, pre-process the historical-authentication data. For instance, the model-training component 122 may normalize the historical-authentication data into a clean version of the data by reconciling differences across different authentication versions, reduce the number of possible values that an attribute takes, extract geolocation and NAT logs from IP form, reduce dimensionality of attributes, and so forth.

The model-training component 122 may generate a training data set 206 and a calibration data set 208. In some instances, the training data set 206 may be older authentications, such as authentications that are older than 2 weeks, but within 6 months (however, other ranges may be used). The calibration data set 208 may be authentications performed more recently, such as within the last 2 weeks or month.

The model-training component 122 may use the training data set 206 to train the sub-models 128 as described above, and use the calibration data set 208 to determine the attribute weighting values 210, as described above. The attribute weighting values 210 may be implemented as the Brier score of that sub-model 128 where the Brier score is a scoring rule that measures the accuracy of probabilistic predictions.

Figure 3:
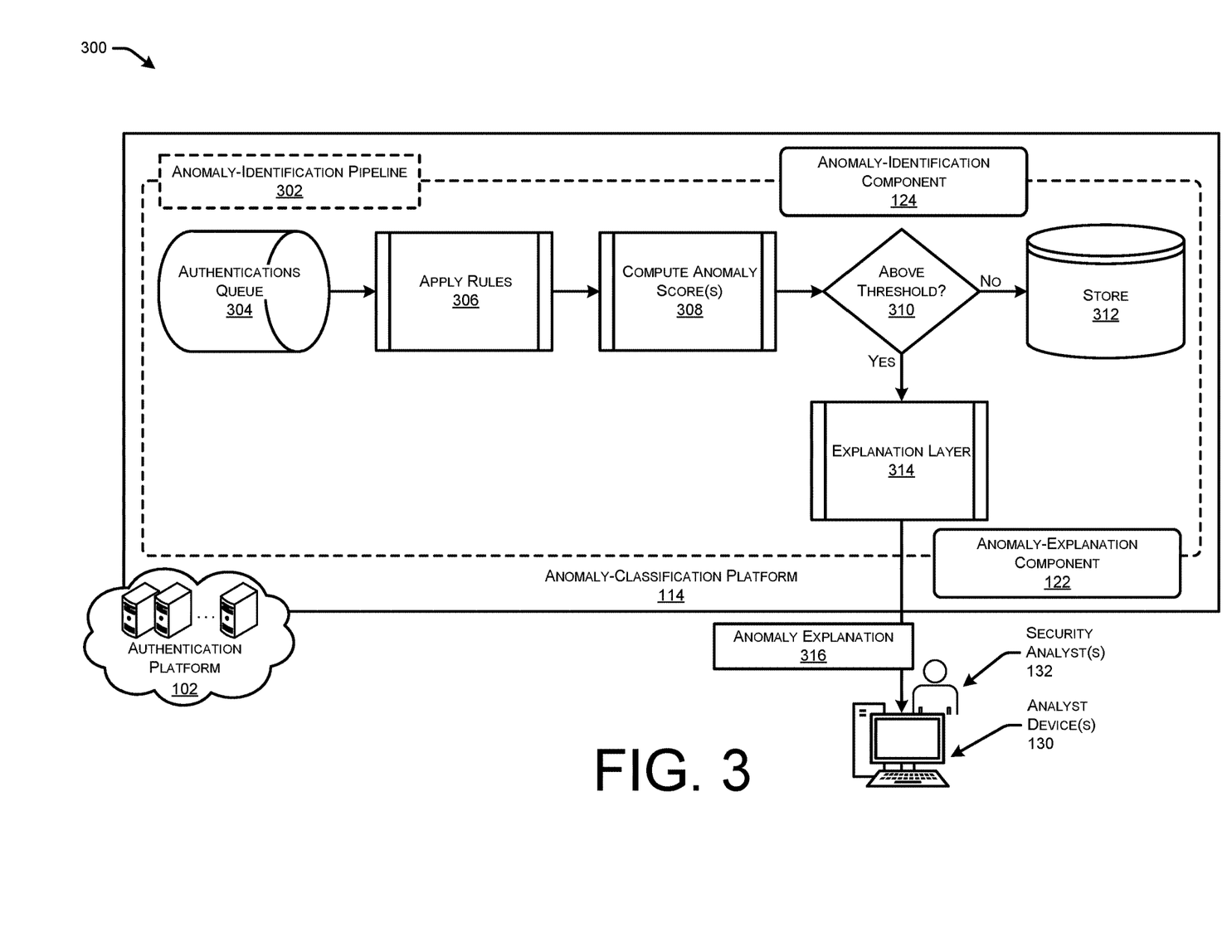
FIG. 3 illustrates a system-architecture diagram of an example environment in which an authentication platform uses models to identify anomalous authentications.

FIG. 3 illustrates a system-architecture diagram of an example environment in which an authentication platform uses models to identify anomalous authentications. The anomaly-identification component 124 may be utilized to perform techniques of the anomaly-identification pipeline 302 as described herein.

At 304, the anomaly-classification platform 114 may store recent authentications in an authentications queue 304. The authentications may be analyzed and removed from the authentications queue 304 in real-time or near-real-time, continuously, periodically, or upon hitting some threshold number of authentications in the queue 304.

The anomaly-identification component 124 may, at 306, apply rules to the authentications. The rules may be applied based on the user 104, such as an organization the user 104 is apart of, to process the authentications. As an example, the anomaly-identification component 124 may apply rules that results in some authentications in the queue 304 being immediately dropped at 306 because they are disinteresting, or are allowed, by the organization.

At 308, the anomaly-identification component 124 may compute anomaly scores 308 for the authentications. For instance, the anomaly-identification component 124 may utilize the sub-models 128 to compute scores across each attribute, apply attribute weighting values 210 to the appropriate anomaly scores, and then calculate an overall anomaly score using the weighted anomalies values across multiple attributes. For instance, the overall anomaly scores 310 may be an average, a sum, or some other representation of multiple anomaly scores calculated for attributes.

At 310, the anomaly-identification component 124 may determine whether the overall anomaly scores are greater than (or equal to) some threshold value. The threshold value/score may be a score determined through testing that is associated with a high probability or confidence level that an authentication is anomalous.

If the anomaly-identification component 124 determines at 310 that authentications are not above (or at) the threshold, and thus not anomalous, the anomaly-identification component 124 may simply store the normal or non-anomalous authentications in a data store.

However, if the anomaly-identification component 124 determines at 310 that the authentications are above, or at, the threshold, the anomaly-explanation component 122 may enter the explanation layer 314 at which an anomaly explanation 316 is generated or determined. For instance, the anomaly-explanation component 122 may determine what attribute or attributes resulted in the authentications being labeled as anomalous, and provide data or explanations around the anomaly for the security analysts 132 to digest and help them understand why the authentication was deemed anomalous. In some instances, there may be pre-defined templates and/or textual explanations that are mapped to attributes and used to generate anomaly explanations 316 when those attributes were deemed anomalous. The anomaly explanations 316 are then output to analyst devices 130 for further consideration.

Figure 4:
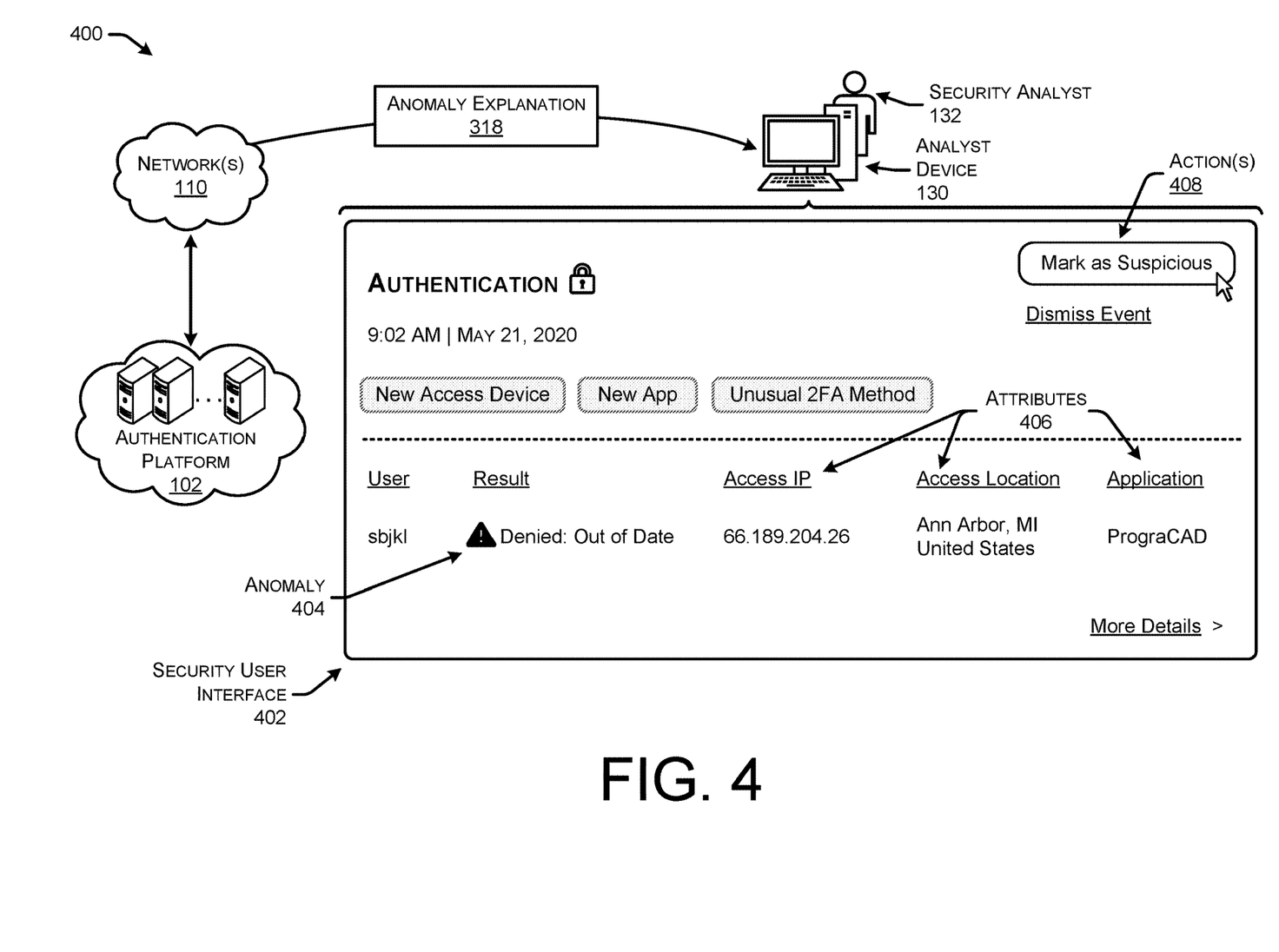
FIG. 4 illustrates an example graphical user interface through which a security agent is presented with data indicating an anomalous authentication, an explanation as to what made the authentication anomalous, and interface options to take an action with respect to the anomalous authentication.

FIG. 4 illustrates an example graphical user interface 402 through which a security agent is presented with data indicating an anomalous authentication, an explanation as to what made the authentication anomalous, and interface options to take an action with respect to the anomalous authentication.

As shown, the security user interface 402 includes an indication of the anomaly 404 that resulted in the authentication being ruled anomalous. Although only one anomaly 404 is shown, multiple anomalies 404 may be shown in examples where multiple attributes were found as anomalous.

Further, the security user interface 402 may include indications of attributes of the anomaly 404, such as access IP, access location, application being accessed, and so forth. The security user interface 402 includes interface elements through which a security analyst 132 may take actions 408, such as marking as suspicious, dismissing the event as not a security threat, preventing the authentication in real-time or near real-time, and so forth.

Figure 5A:
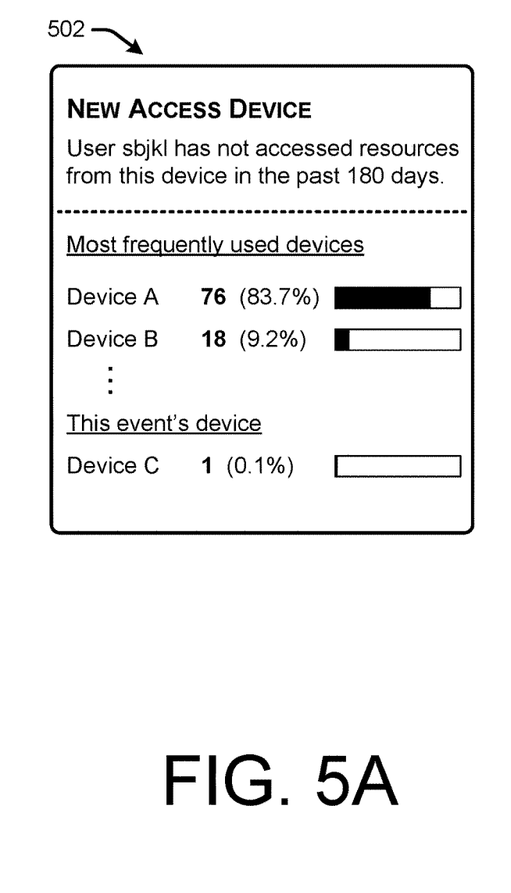
FIGS. 5A-5C illustrates example graphical user interfaces that represent different anomalous authentications and explanations as to why the authentications were identified as anomalous.
Figure 5B:
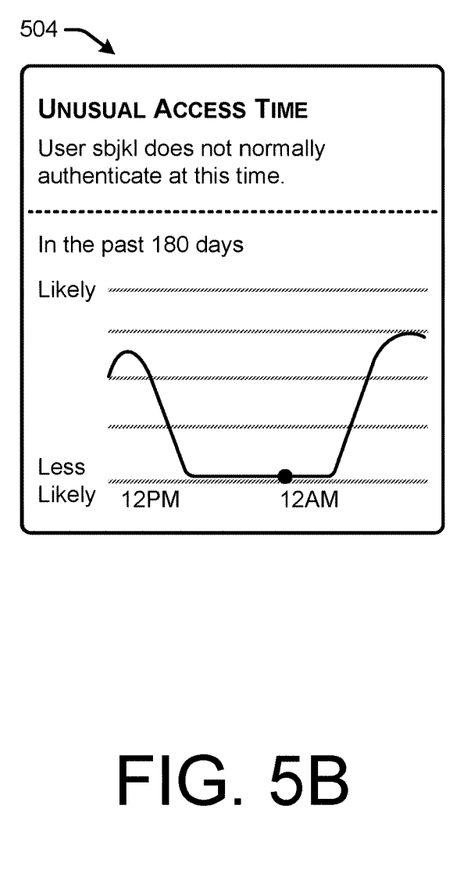
Figure 5C:
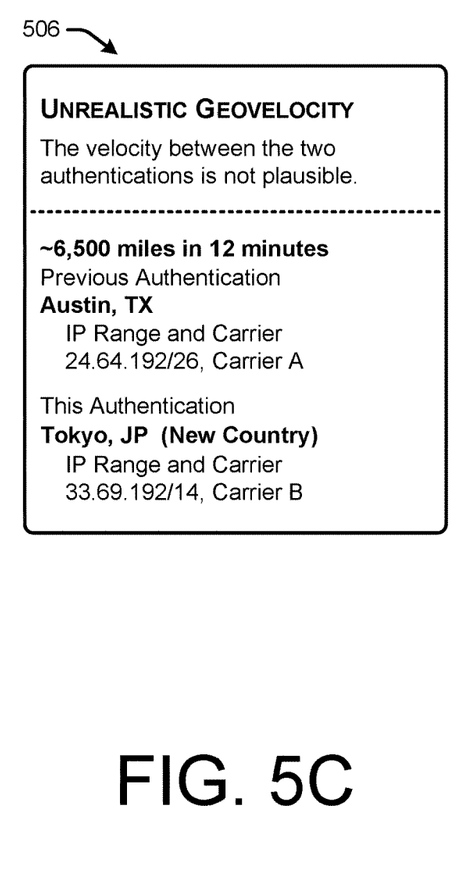

FIGS. 5A-5C illustrates example graphical user interfaces that represent different anomalous authentications and explanations as to why the authentications were identified as anomalous.

User interface 502 illustrates an example where a new access device is used by a user 104 to authenticate where that device 106 has not been used by that user 104 before. The user interface 502 presents information around why the new device 106 was flagged as anomalous, such as how long it has been since the device 106 was used, what devices are usually used, and so forth. The security analyst 132 make block the authentication or report it as potentially malicious if the event seems malicious. However, the security analyst 132 may also know that the user 104 was recently issued a new work computer, and mark the authentication as safe.

User interface 504 illustrates an example where an authentication was performed by a user 104 at an unusual access time. The user interface 504 may indicate that the user 104 does not normally authenticate at the particular time, and also illustrate when the authentication was made as compared to a normal authentication trend for the user 104. In this way, the security analyst 132 is provided with helpful information around why the authentication was flagged as anomalous.

User interface 506 illustrates an example where authentications were performed by a same user 104 at geolocations that are unrealistic or improbable, and thus one of the authentications is likely malicious or improper. The user interface 506 may indicate the two locations at which the same user 104 allegedly attempted to authenticate. Additionally, the user interface 506 may indicate how many miles apart the locations are, and how much time passed between the two authentications. In this example, it would not be possible for the same user 104 to authenticate in Austin, Texas and then again in Tokyo, Japan, 12 minutes apart when the two cities are around 6,500 miles apart.

Figure 6:
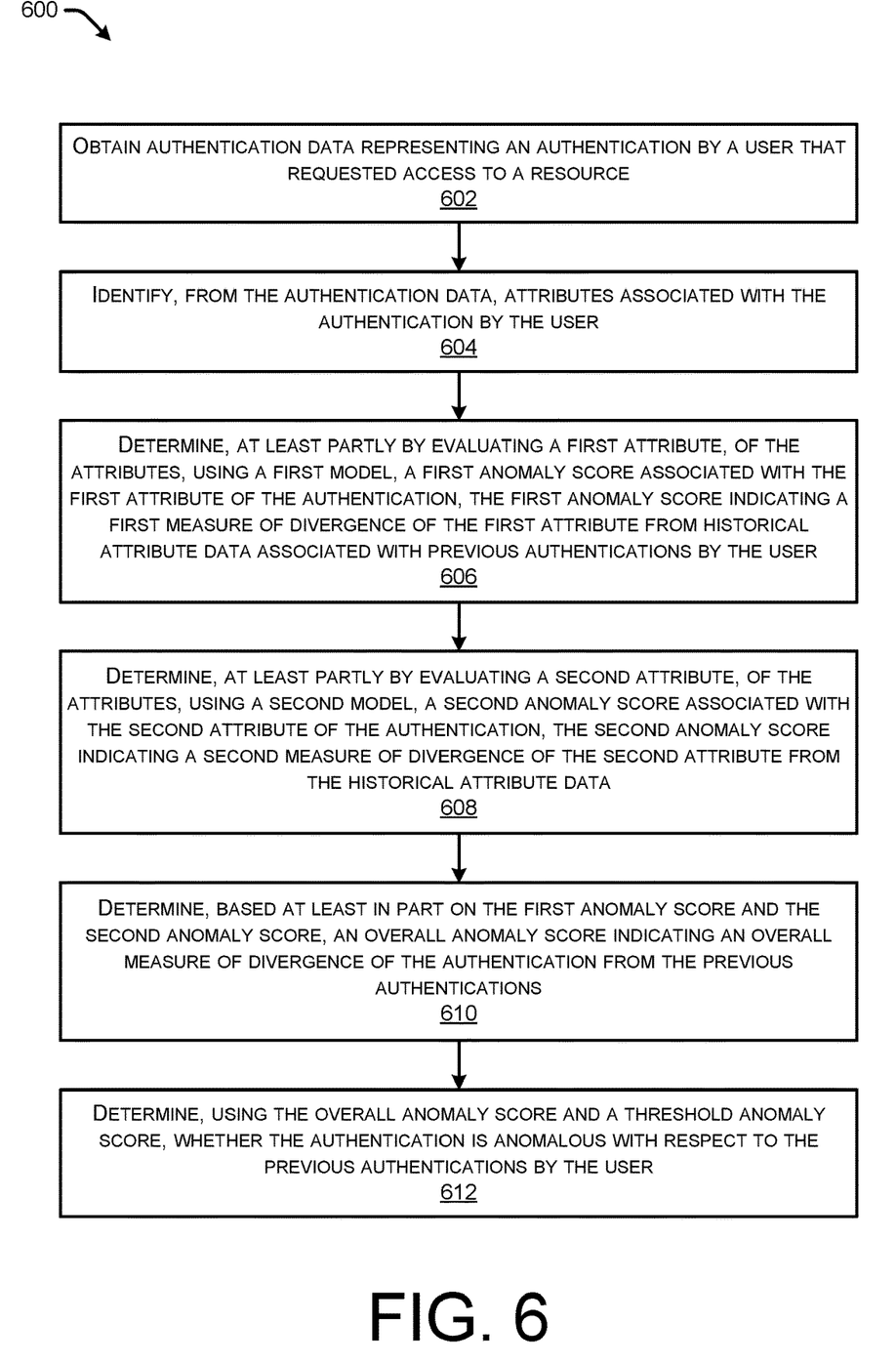
FIG. 6 illustrates a flow diagram of an example method for an authentication platform that uses models to identify anomalous authentications by evaluating multiple attributes of the authentications.

FIG. 6 illustrates a flow diagram of an example method 600 that illustrates aspects of the functions performed at least partly by the authentication platform 102 as described in this disclosure. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 600 may be performed by the authentication platform 102. As noted above, the authentication platform 102 may run at least partly in a cloud, data center, or other centralized environment, and may run at least partly on one device or a system of devices. That is, the operations of method 600 may be performed entirely by a device, entirely by a centralized (or distributed) system running on servers or other network devices, and/or a combination thereof.

FIG. 6 illustrates a flow diagram of an example method 600 for an authentication platform that uses models to identify anomalous authentications by evaluating multiple attributes of the authentications.

At 602, the authentication platform 102 may obtain authentication data representing an authentication by a user that requested access to a resource. For instance, the authentication platform 102 may receive the authentication in real-time or near real-time as a user 104 is attempting to authenticate to user an application or service 108. As another example, the authentication platform 102 may obtain the authentication from an authentication queue 304 where the authentication has already been approved, but is in review for a security analyst 132.

At 604, the authentication platform 102 may identify, from the authentication data, attributes associated with the authentication by the user. For instance, the authentication platform 102 may identify multiple attributes from a group of attributes including at least an identity of the user 104, a geographic location associated with a user device 106 used by the user 104 to perform the authentication 112, a type of a device 106 used to perform the authentication, a first type of a first device 106A and a second type of a second device 106B used to perform a multi-factor authentication included in the authentication 112, at least one of a time of day or a day of a week at which the authentication 112 was performed, an application or service 108 attempting to be accessed by the user by performing the authentication, a type of authentication method 112 performed as part of the authentication, or a type of network by which the user performed the authentication 112.

At 606, the authentication platform 102 may determine, at least partly by evaluating a first attribute, of the attributes, using a first model, a first anomaly score associated with the first attribute of the authentication. Generally, the first anomaly score indicates a first measure of divergence of the first attribute from historical attribute data associated with previous authentications by the user.

At 608, the authentication platform 102 may determine, at least partly by evaluating a second attribute, of the attributes, using a second model, a second anomaly score associated with the second attribute of the authentication. Generally, the second anomaly score indicating a second measure of divergence of the second attribute from the historical attribute data.

At 610, the authentication platform 102 may determine, based at least in part on the first anomaly score and the second anomaly score, an overall anomaly score indicating an overall measure of divergence of the authentication from the previous authentications.

At 612, the authentication platform 102 may determine, using the overall anomaly score and a threshold anomaly score, whether the authentication is anomalous with respect to the previous authentications by the user.

Figure 7:
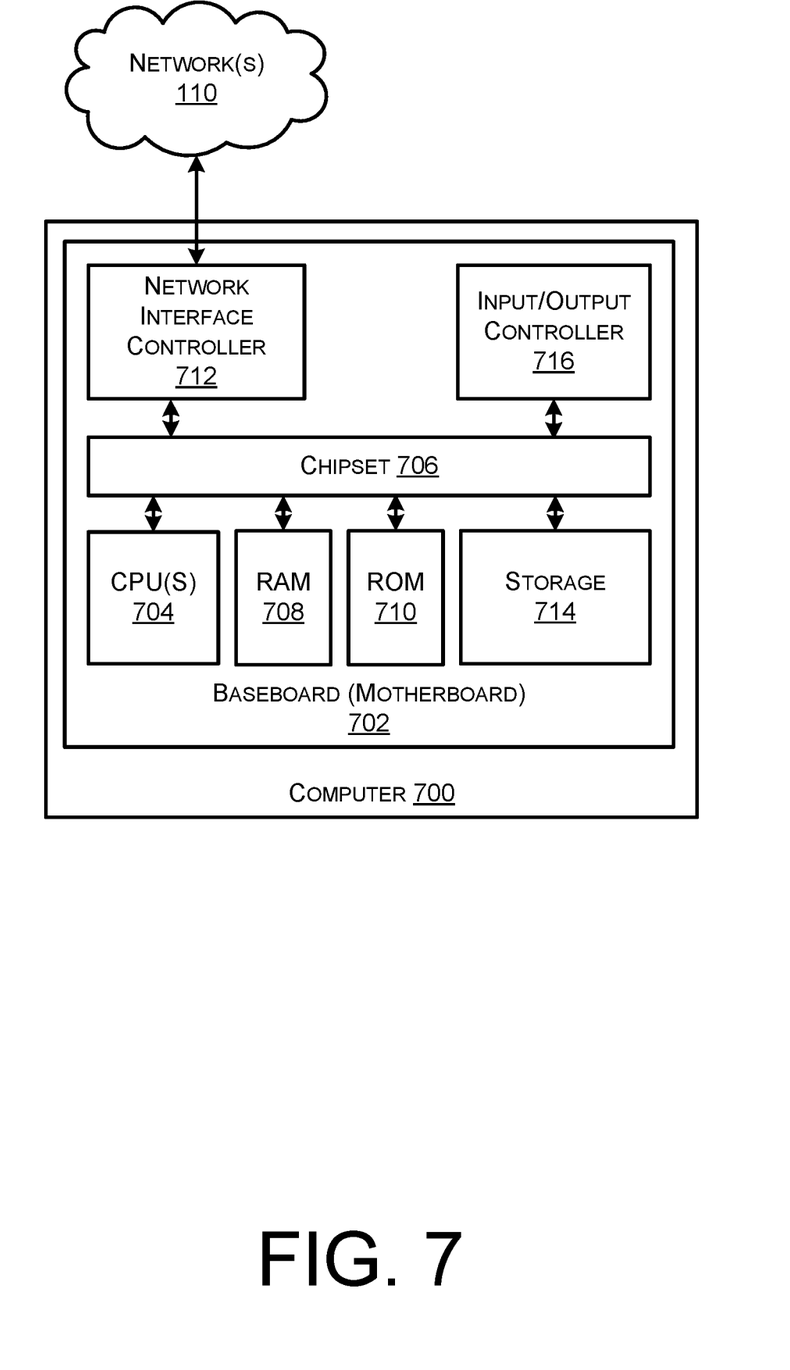
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described herein. The computer architecture shown in FIG. 7 illustrates a conventional server computer, workstation, desktop computer, laptop, tablet, network appliance, e-reader, smartphone, or other computing device, and can be utilized to execute any of the software components presented herein. In some examples, the computer 700 may be part of a system of computers, such as the authentication platform (or system) 102. In some instances, the computer 700 may be included in a system of devices that perform the operations described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 110. The chipset 706 can include functionality for providing network connectivity through a network interface controller (NIC) 712, such as a gigabit Ethernet adapter. The NIC 712 is capable of connecting the computer 700 to other computing devices over the network 110. It should be appreciated that multiple NICs 712 can be present in the computer 700, connecting the computer to other types of networks and remote computer systems.

The computer 700 can include storage 714 (e.g., disk) that provides non-volatile storage for the computer. The storage 714 can consist of one or more physical storage units. The storage 714 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage 714 by detecting the physical states or characteristics of one or more particular locations within the physical storage units.

In addition to the storage 714 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the contact-center infrastructure 102, and or any components included therein, may be supported by one or more devices similar to computer 700. Stated otherwise, some or all of the operations performed by the contact-center infrastructure 102, and or any components included therein, may be performed by one or more computer devices 700 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 714 can store an operating system utilized to control the operation of the computer 700. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 714 can store other system or application programs and data utilized by the computer 700.

In one embodiment, the storage 714, RAM 708, ROM 710, and/or other computer-readable storage media may be encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various techniques described above. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by an authentication platform, the method comprising:
obtaining authentication data representing an authentication by a user that requested access to a resource;
identifying, from the authentication data, attributes associated with the authentication by the user;
determining, at least partly by evaluating a first attribute, of the attributes, using a first model, a first anomaly score associated with the first attribute of the authentication, the first anomaly score indicating a first measure of divergence of the first attribute from historical attribute data associated with previous authentications by the user;
determining, at least partly by evaluating a second attribute, of the attributes, using a second model, a second anomaly score associated with the second attribute of the authentication, the second anomaly score indicating a second measure of divergence of the second attribute from the historical attribute data;
determining, based at least in part on the first anomaly score and the second anomaly score, an overall anomaly score indicating an overall measure of divergence of the authentication from the previous authentications; and
determining, using the overall anomaly score and a threshold anomaly score, whether the authentication is anomalous with respect to the previous authentications by the user.

2. The method of claim 1, wherein the first attribute and the second attribute are different ones of at least one of:
an identity of the user;
a geographic location associated with a user device used by the user to perform the authentication;
a type of a device used to perform the authentication;
a first type of a first device and a second type of a second device used to perform a multi-factor authentication included in the authentication;
at least one of a time of day or a day of a week at which the authentication was performed;
an application or service attempting to be accessed by the user by performing the authentication;
a type of authentication method performed as part of the authentication; or
a type of network by which the user performed the authentication.

3. The method of claim 1, further comprising:
obtaining a first weighting value associated with the first model, the first weighting value indicating a first measure of accuracy associated with the first model detecting an anomalous authentication;
applying the first weighting value to the first anomaly score prior to determining the overall anomaly score;
obtaining a second weighting value associated with the second model, the second weighting value indicating a second measure of accuracy associated with the second model detecting an anomalous authentication; and
applying the second weighting value to the second anomaly score prior to determining the overall anomaly score.

4. The method of claim 3, further comprising:
obtaining training data representing recent authentications that were performed by the user during a period of time between when the previous authentications and the authentication were performed;
determining, using the training data, the first weighting value associated with the first model; and
determining, using the training data, the second weighting value associated with the second model.

5. The method of claim 1, wherein determining the first anomaly score includes:
determining a first probability value associated with expected attribute values for the first attribute;
determining a second probability value associated with observed attribute values for the attributes associated with the authentication; and
determining a ratio of the first probability value with respect to the second probability value.

6. The method of claim 1, wherein determining whether the authentication is anomalous with respect to the previous authentications by the user includes determining that the authentication is anomalous, further comprising:
outputting, to an analyst device, an indication of the authentication as being anomalous; and
outputting, to the analyst device, explanation data indicating an explanation as to why the authentication is anomalous as compared to the previous authentications by the user.

7. The method of claim 1, further comprising:
obtaining historical authentication data representing the previous authentications by the user;
determining first training data using the historical authentication data, wherein the first training data indicates, for respective values of the first attribute, expected values of first other ones of the attributes observed in the historical authentication data;
training, using the first training data, the first model to determine anomaly scores for the respective values of the first attribute based on the expected values of the first other ones of the attributes and observed values of the first other ones of the attributes;
determining second training data using the historical authentication data, wherein the second training data indicates, for respective values of the second attribute, expected values of second other ones of the attributes observed in the historical authentication data; and
training, using the second training data, the second model to determine anomaly scores for the respective values of the second attribute based on the expected values of the second other ones of the attributes and observed values of the second other ones of the attributes.

8. A system comprising:
one or more processors; and
one or more non-transitory computer-readable media storing computer-executable instructions that, when executed by the one or more processors, cause the one or more processors to perform operations comprising:
obtaining authentication data representing an authentication by a user that requested access to a resource;
identifying, from the authentication data, attributes associated with the authentication by the user;
determining, at least partly by evaluating a first attribute, of the attributes, using a first model, a first anomaly score associated with the first attribute of the authentication, the first anomaly score indicating a first measure of divergence of the first attribute from historical attribute data associated with previous authentications by the user;
determining, at least partly by evaluating a second attribute, of the attributes, using a second model, a second anomaly score associated with the second attribute of the authentication, the second anomaly score indicating a second measure of divergence of the second attribute from the historical attribute data;

determining, based at least in part on the first anomaly score and the second anomaly score, an overall anomaly score indicating an overall measure of divergence of the authentication from the previous authentications; and determining, using the overall anomaly score and a threshold anomaly score, whether the authentication is anomalous with respect to the previous authentications by the user.

9. The system of claim 8, wherein the first attribute and the second attribute are different ones of at least one of:
an identity of the user;
a geographic location associated with a user device used by the user to perform the authentication;
a type of a device used to perform the authentication;
a first type of a first device and a second type of a second device used to perform a multi-factor authentication included in the authentication;
at least one of a time of day or a day of a week at which the authentication was performed;
an application or service attempting to be accessed by the user by performing the authentication;
a type of authentication method performed as part of the authentication; or
a type of network by which the user performed the authentication.

10. The system of claim 8, the operations further comprising:
obtaining a first weighting value associated with the first model, the first weighting value indicating a first measure of accuracy associated with the first model detecting an anomalous authentication;
applying the first weighting value to the first anomaly score prior to determining the overall anomaly score;
obtaining a second weighting value associated with the second model, the second weighting value indicating a second measure of accuracy associated with the second model detecting an anomalous authentication; and
applying the second weighting value to the second anomaly score prior to determining the overall anomaly score.

11. The system of claim 10, the operations further comprising;
obtaining training data representing recent authentications that were performed by the user during a period of time between when the previous authentications and the authentication were performed;
determining, using the training data, the first weighting value associated with the first model; and
determining, using the training data, the second weighting value associated with the first model.

12. The system of claim 8, wherein determining the first anomaly score includes:
determining a first probability value associated with expected attribute values for the first attribute;
determining a second probability value associated with observed attribute values for the attributes associated with the authentication; and
determining a ratio of the first probability value with respect to the second probability value.

13. The system of claim 8, wherein determining whether the authentication is anomalous with respect to the previous authentications by the user includes determining that the authentication is anomalous, the operations further comprising:

outputting, to an analyst device, an indication of the authentication as being anomalous; and
outputting, to the analyst device, explanation data indicating an explanation as to why the authentication is anomalous as compared to the previous authentications by the user.

14. The system of claim 8, the operations further comprising:
obtaining historical authentication data representing the previous authentications by the user;
determining first training data using the historical authentication data, wherein the first training data indicates, for respective values of the first attribute, expected values of first other ones of the attributes observed in the historical authentication data;
training, using the first training data, the first model to determine anomaly scores for the respective values of the first attribute based on the expected values of the first other ones of the attributes and observed values of the first other ones of the attributes;
determining second training data using the historical authentication data, wherein the second training data indicates, for respective values of the second attribute, expected values of second other ones of the attributes observed in the historical authentication data; and
training, using the second training data, the second model to determine anomaly scores for the respective values of the second attribute based on the expected values of the second other ones of the attributes and observed values of the second other ones of the attributes.

15. One or more non-transitory computer-readable media storing computer-readable instructions that, when executed by one or more processors, cause the one or more processors to perform operations comprising:
obtaining authentication data representing an authentication by a user that requested access to a resource;
identifying, from the authentication data, attributes associated with the authentication by the user;
determining, at least partly by evaluating a first attribute, of the attributes, using a first model, a first anomaly score associated with the first attribute of the authentication, the first anomaly score indicating a first measure of divergence of the first attribute from historical attribute data associated with previous authentications by the user;
determining, at least partly by evaluating a second attribute, of the attributes, using a second model, a second anomaly score associated with the second attribute of the authentication, the second anomaly score indicating a second measure of divergence of the second attribute from the historical attribute data;
determining, based at least in part on the first anomaly score and the second anomaly score, an overall anomaly score indicating an overall measure of divergence of the authentication from the previous authentications; and
determining, using the overall anomaly score and a threshold anomaly score, whether the authentication is anomalous with respect to the previous authentications by the user.

16. The one or more non-transitory computer-readable media of claim 15, wherein the first attribute and the second attribute are different ones of at least one of:
an identity of the user;
a geographic location associated with a user device used by the user to perform the authentication;
a type of a device used to perform the authentication;

a first type of a first device and a second type of a second device used to perform a multi-factor authentication included in the authentication;

at least one of a time of day or a day of a week at which the authentication was performed;

an application or service attempting to be accessed by the user by performing the authentication;

a type of authentication method performed as part of the authentication; or a type of network by which the user performed the authentication.

17. The one or more non-transitory computer-readable media of claim 15, the operations further comprising:

obtaining a first weighting value associated with the first model, the first weighting value indicating a first measure of accuracy associated with the first model detecting an anomalous authentication;

applying the first weighting value to the first anomaly score prior to determining the overall anomaly score;

obtaining a second weighting value associated with the second model, the second weighting value indicating a second measure of accuracy associated with the second model detecting an anomalous authentication; and applying the second weighting value to the second anomaly score prior to determining the overall anomaly score.

18. The one or more non-transitory computer-readable media of claim 17, the operations further comprising;

obtaining training data representing recent authentications that were performed by the user during a period of time between when the previous authentications and the authentication were performed;

determining, using the training data, the first weighting value associated with the first model; and determining, using the training data, the second weighting value associated with the first model.

19. The one or more non-transitory computer-readable media of claim 15, wherein determining the first anomaly score includes:

determining a first probability value associated with expected attribute values for the first attribute;

determining a second probability value associated with observed attribute values for the attributes associated with the authentication; and determining a ratio of the first probability value with respect to the second probability value.

20. The one or more non-transitory computer-readable media of claim 15, wherein determining whether the authentication is anomalous with respect to the previous authentications by the user includes determining that the authentication is anomalous, the operations further comprising:

outputting, to an analyst device, an indication of the authentication as being anomalous; and outputting, to the analyst device, explanation data indicating an explanation as to why the authentication is anomalous as compared to the previous authentications by the user.

* * * * *